United States Patent [19]

Viertel et al.

[11] Patent Number: 5,449,215
[45] Date of Patent: Sep. 12, 1995

[54] SUN VISOR FOR VEHICLES AND METHOD OF PRODUCING THE SAME

[75] Inventors: Lothar Viertel, Altforweiler, Germany; Patrick Welter, Lachambre, France

[73] Assignee: Gebr. Happich GmbH, Wuppertal, Germany

[21] Appl. No.: 98,504

[22] Filed: Jul. 28, 1993

[30] Foreign Application Priority Data

Aug. 8, 1992 [DE] Germany .............. 42 26 252.6

[51] Int. Cl.⁶ .................................................. B60J 3/02
[52] U.S. Cl. .................. 296/97.9; 296/97.12; 264/279.1
[58] Field of Search ........... 296/97.1, 97.9, 97.12, 296/97.13; 160/370.2, DIG. 3; 264/279.1

[56] References Cited

U.S. PATENT DOCUMENTS

| | | | |
|---|---|---|---|
| 2,703,254 | 3/1955 | Shockey | 296/97.12 |
| 3,150,896 | 9/1964 | Plattner . | |
| 3,333,886 | 8/1967 | Wenger . | |
| 4,469,367 | 9/1984 | Kuttler et al. | 296/97.9 |

FOREIGN PATENT DOCUMENTS

| | | | |
|---|---|---|---|
| 0036467 | 1/1981 | European Pat. Off. . | |
| 0068269 | 1/1983 | European Pat. Off. . | |
| 70379 | 1/1983 | European Pat. Off. | 296/97.1 |
| 34215 | 3/1983 | European Pat. Off. . | |
| 0099968 | 2/1984 | European Pat. Off. . | |
| 0230915 | 1/1987 | European Pat. Off. . | |
| 1194761 | 5/1959 | France . | |
| 1562852 | 4/1969 | France | 296/97.1 |
| 2450709 | 10/1980 | France . | |
| 1753100 | 9/1957 | Germany . | |
| 7221413 | 6/1972 | Germany . | |
| 2201250 | 7/1973 | Germany . | |
| 2234921 | 1/1974 | Germany . | |
| 2551633 | 5/1977 | Germany . | |
| 2913933 | 10/1979 | Germany . | |
| 409173 | 4/1934 | United Kingdom | 296/97.9 |
| 2032368 | 5/1980 | United Kingdom | 296/97.1 |

*Primary Examiner*—Dean J. Kramer
*Attorney, Agent, or Firm*—Ostrolenk, Faber, Gerb & Soffen

[57] ABSTRACT

A vehicle sun visor includes a plastic foam body molded around a stiffening wire frame. The wire frame is a single wire that is bent to define two spaced apart wire eyes oriented to receive the visor mounting shaft through them, and to define a cross piece extending between and connecting the eyes. A visor shaft clamping spring is fastened to the cross piece between the wire eyes. The ends of the bent wire frame are overlapped, enclosed in a plastic enclosure and are located at the visor body to define the outer support pin.

14 Claims, 1 Drawing Sheet

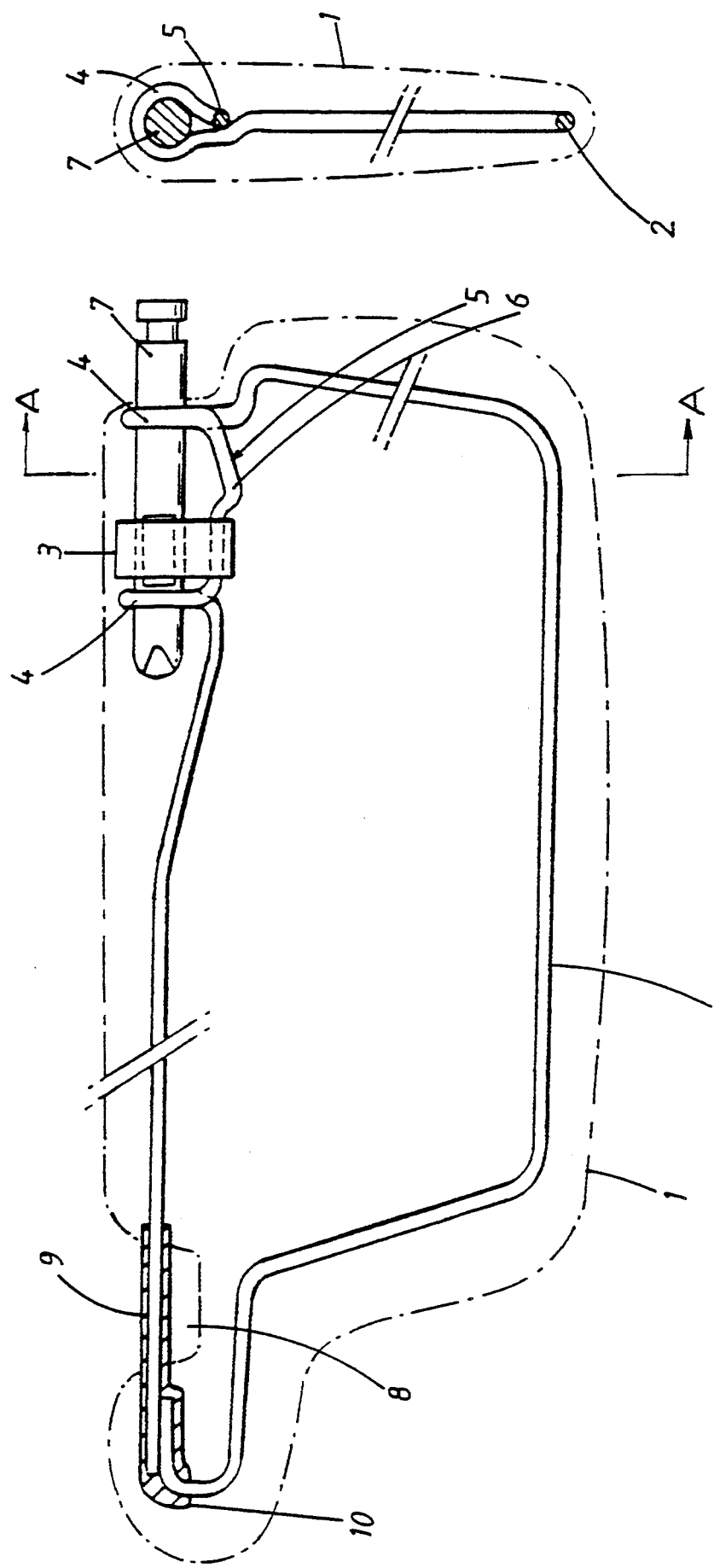

SUN VISOR FOR VEHICLES AND METHOD OF PRODUCING THE SAME

BACKGROUND OF THE INVENTION

The present invention refers to a sun visor for vehicles which has a sun-visor body incorporating a wire frame for stiffening it, a mounting support for a sun-visor shaft, and a spring which clamps on the sun-visor shaft.

A sun visor of this type is shown in EP-B-0 034 215. In that known sun visor, the mounting support for the sun-visor shaft is formed of a sheet-metal housing which must be produced separately and then be attached to the wire frame by, for instance, spot welding.

Sun visor shaft mounting openings on the stiffening frame are shown in DE-OS 29 13 933. Using a wire reinforcing frame to receive a support element for a visor is shown in DE 1,753,100.

SUMMARY OF THE INVENTION

The object of the present invention is to provide a sun visor of the aforementioned type which has fewer individual parts and which can be manufactured simply and at lower cost.

In accordance with the invention, the mounting support for the sun visor shaft is formed by two wire eyes which are produced by bending the wire of the wire frame. The eyes are arranged spaced apart from each other and oriented so that the shaft can pass through both eyes. A wire cross-piece connects the wire eyes to each other. The shaft engaging spring is fastened on the cross-piece.

Since a wire bending device is in any event used for forming the wire frame which stiffens the sun-visor body, the additional bending operations which are needed for forming wire eyes do not result in any significant additional expense. As another feature of the invention, the wire frame and the mounting support in the form of wire eyes for the sun-visor shaft are developed as a single piece, whereby the separate manufacture, storing and mounting of the previously customary sheet-metal housing for the shaft can be avoided.

The wire frame advantageously also carries the spring which clamps the sun-visor shaft on a wire cross-piece that connects the wire eyes to each other. As a further development of the invention, at least one crimp is developed on the wire cross-piece for preventing sliding of the spring thereon.

In a further development of the invention, an assembly aid pin can be passed through the wire eyes and the opening through the spring. That pin can be replaced by the sun-visor shaft after the completion of the formation of the sun-visor body. This enables easy manufacture of the sun-visor body and allows alignment in proper position of the wire eyes and the spring with respect to each other. It also enables formation of the mounting hole in the sun-visor body for the subsequent insertion of the sun-visor shaft. This measure is advantageous where the wire frame with wire eyes, spring, and mounting aid pin are later embedded in the sun-visor body by being covered with a foam, which consists of a plastic foam.

Finally, the wire frame, together with the wire eyes and the wire cross-piece, may be bent from a single piece of wire. The free ends of the wire piece may be arranged, possibly with overlap, in the region of an outer support for the visor body and may there be surrounded by a plastic body. The plastic body may at the same time be developed as an outer support pin.

Other features and advantages of the present invention will become apparent from the following description of the invention which refers to the accompanying drawings.

BRIEF DESCRIPTION OF THE DRAWINGS

FIG. 1 shows the sun-visor body of a sun visor, and
FIG. 2 is a section A—A in accordance with FIG. 1.

DESCRIPTION OF THE PREFERRED EMBODIMENT

FIG. 1 shows the outer contour of an essentially thin or flat sun-visor body 1 in dash-dot line and shows a frame 2 inside that body in solid lines. The frame comprises a wire frame which, on a reduced scale, follows approximately the contour of the sun-visor body 1. The sun-visor includes a spring 3.

The wire frame 2 is formed from a single bent piece of wire, shaped such that, on the one hand, it extends approximately parallel to and in from the peripheral edges of the sun-visor body 1 and, on the other hand, is developed with wire eyes 4.

The wire eyes 4 are bent off to be in planes perpendicular to the general plane of the sun-visor body 1 and so that a support shaft may be inserted through both wire eyes and its axis will coincide with the plane of the sun visor body. The wire eyes 4 are spaced apart a distance from each other and are connected to each other by a wire cross-piece 5.

The bottom end of the usually U-shaped spring 3 is fastened to the wire cross-piece 5. One leg of the spring is visible. Displacement of the spring 3 along the cross-piece is prevented by a crimp 6 in the wire cross-piece 5. The spring 3 may comprise an ordinary detent spring, for instance a spring of the type disclosed in Federal Republic of Germany Patent 25 51 633.

A mounting aid pin 7 is passed through the wire eyes 4 and through the clamping opening (not shown) of the spring 3. The pin 7 assures the initial alignment and positions of these parts with respect to each other. This applies, in particular, to an operation in which the wire frame 2 is placed in a foaming mold and is then foamed with plastic material in order to form the sun-visor body 1. An insertion opening is also created in the foamed molded sun-visor body 1 by the mounting aid pin 7. A sun-visor shaft (not shown) can be inserted into that opening after the mounting aid pin 7 is removed.

The mounting support for the sun-visor shaft, which is formed by the wire eyes 4, is present on the right hand side of FIG. 1 on the upper longitudinal edge of the sun-visor body 1. On the left side of FIG. 1, along the upper longitudinal edge, there is an outer support pin 9 which passes across a cutout 8 and is intended for detachable engagement in an outer support bracket, not shown, on the vehicle. The outer support pin 9 is held in a plastic body 10 which grips over the separate ends of the bent wire frame 2 present there and holds the ends fast against each other. The plastic body 10 can be formed by injection around the wire ends which are placed in the mold cavity of a plastic injection molding machine. The wires ends possibly may be overlapped, as shown, or may be otherwise relatively positioned.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A sun visor for a vehicle comprising:
   a sun visor body;
   a wire frame in the body for stiffening the body, the wire frame extending through the body; the wire frame defining a mounting support for receiving a sun visor shaft;
   the mounting support comprising two eyes formed in the wire frame at two spaced apart locations, and a cross-piece of the wire extending between the two eyes, the eyes being oriented so that a shaft may be inserted through and supported in both of the eyes;
   a spring in the visor body for being clamped over a sun visor shaft that has been inserted into the eyes, the spring being attached to the cross-piece between the wire eyes; and
   a crimp, disposed on the cross-piece, of a shape for preventing displacement of the spring along the cross-piece.

2. The sun visor of claim 1, further comprising a plastic foam body in which the wire frame, the wire eyes and the spring are disposed, an opening in the body and extending through the wire eyes for receiving there a sun visor mounting shaft.

3. The sun visor of claim 1, wherein the wire frame is formed from a bent length of wire and the wire has free ends away from the wire eyes.

4. The sun visor of claim 3, wherein the wire is arranged in the region of an outer support for the visor body away from the wire eyes and the wire in the outer support region serving as an outer support pin.

5. The sun visor of claim 4, wherein in the region of the outer support, the wire is surrounded by a plastic enclosure.

6. The sun visor of claim 5, wherein in the region of the outer support, the wire is so placed that the free ends of the wire overlap each other in the outer support region.

7. The sun visor of claim 4, wherein in the region of the outer support, the wire is so placed that the free ends of the wire overlap each other in the outer support region.

8. The sun visor of claim 1, wherein the visor body has a periphery, and the wire frame extends around and inside the periphery of the sun visor.

9. The sun visor of claim 8, wherein the bent wire frame is so shaped and the wire eyes are so placed that the wire eyes are toward one corner of the visor body where a mounting shaft would be received.

10. A method of producing a sun visor comprising:
    bending a wire frame, which is to be used for reinforcing a sun visor body, to define along the length of the wire frame two spaced apart wire eyes that each are open in a direction to receive a mounting shaft for a visor, and with a cross-piece extending between the wire eyes;
    placing a mounting shaft engaging spring on the cross-piece for engaging a mounting shaft positioned in the wire eyes;
    disposing the wire frame in a mold, and in the mold embedding the wire frame with the eyes in a plastic foam material for forming the visor body;
    removing the completed visor body from the mold.

11. The method of claim 10, further comprising after forming the wire eyes, inserting a mounting aid pin through the wire eyes for preserving a mounting shaft receiving hole in the body to be molded, and molding the visor body around the wire frame with the mounting aid pin in place through the wire eyes;
    after molding, removing the mounting aid pin leaving an opening for the sun visor shaft.

12. The method of claim 10, further comprising bending the wire so as to place the ends thereof in close proximity.

13. The method of claim 12, further comprising overlapping the ends of the wire and enclosing the ends where they overlap in a plastic body and locating the plastic body where it may serve as the outer support pin for the visor body.

14. A sun visor produced by a method comprising the steps of:
    bending a wire frame, which is to be used for reinforcing a sun visor body, to define along the length of the wire frame two spaced apart wire eyes that each are open in a direction to receive a mounting shaft for a visor, and with a cross-piece extending between the wire eyes;
    placing a mounting shaft engaging spring on the cross-piece for engaging a mounting shaft positioned in the wire eyes;
    disposing the wire frame in a mold, and in the mold embedding the wire frame with the eyes in a plastic foam material for forming the visor body; and
    removing the completed visor body from the mold.

* * * * *